United States Patent
Lee

(10) Patent No.: US 9,677,821 B2
(45) Date of Patent: Jun. 13, 2017

(54) AIR CONDITIONER

(71) Applicant: Sangmu Lee, Tokyo (JP)

(72) Inventor: Sangmu Lee, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 718 days.

(21) Appl. No.: 13/840,083

(22) Filed: Mar. 15, 2013

(65) Prior Publication Data

US 2013/0199765 A1 Aug. 8, 2013

Related U.S. Application Data

(62) Division of application No. 12/680,602, filed as application No. PCT/JP2008/071492 on Nov. 27, 2008.

(30) Foreign Application Priority Data

Nov. 28, 2007 (JP) .................... 2007-307483

(51) Int. Cl.
*F25B 1/00* (2006.01)
*F28F 1/40* (2006.01)
(Continued)

(52) U.S. Cl.
CPC ............... *F28F 1/40* (2013.01); *B21D 53/08* (2013.01); *F25B 39/00* (2013.01); *F28F 1/10* (2013.01);
(Continued)

(58) Field of Classification Search
CPC ..................................... F28F 1/40; F28F 1/10
(Continued)

(56) References Cited

U.S. PATENT DOCUMENTS 4,480,684 A 11/1984 Onishi et al.
5,597,039 A * 1/1997 Rieger ................ F28F 1/42
165/133

(Continued)

FOREIGN PATENT DOCUMENTS

EP 0148609 A2 7/1985
JP 06-147532 A 5/1994
(Continued)

OTHER PUBLICATIONS

Altman et al., Modern Refrigeration and Air Conditioning, The Goodheart-Wilcox Company, Inc, 18th Edition, p. 336, Figure 9.1.*
(Continued)

*Primary Examiner* — David Teitelbaum
(74) *Attorney, Agent, or Firm* — Buchanan Ingersoll & Rooney PC

(57) ABSTRACT

To increase a heat exchange capacity of an indoor heat exchanger without increasing a pressure loss inside tubes of an outdoor heat exchanger. A heat exchanger is constituted by an indoor machine equipped with an indoor heat exchanger 10 constituted by a plurality of heat transfer tubes 12A, which have a spiral grooves 13A formed with a predetermined lead angle Ra on inner faces of the tubes and are made to pierce a plurality of fins 11, and an outdoor machine equipped with an outdoor heat exchanger 20 constituted by a plurality of heat transfer tubes 22A which have a lead angle Rb of spiral grooves 23A smaller than that of a heat transfer tubes 10A used for the indoor heat exchanger 10 and are made to pierce a plurality of fins 11.

14 Claims, 4 Drawing Sheets

(51) Int. Cl.
*B21D 53/08* (2006.01)
*F25B 39/00* (2006.01)
*F28F 1/32* (2006.01)
*F28F 1/42* (2006.01)
*F28F 1/10* (2006.01)

(52) U.S. Cl.
CPC ............... *F28F 1/32* (2013.01); *F28F 1/42* (2013.01); *F28F 1/422* (2013.01); *F25B 2500/01* (2013.01)

(58) Field of Classification Search
USPC .................................. 62/498; 165/133, 151
See application file for complete search history.

(56) References Cited

U.S. PATENT DOCUMENTS

| | | | |
|---|---|---|---|
| 5,791,405 | A | 8/1998 | Takiura et al. |
| 6,001,216 | A | 12/1999 | Lee |
| 6,082,132 | A | 7/2000 | Numoto et al. |
| 6,173,763 | B1 | 1/2001 | Sano et al. |
| 6,336,501 | B1 | 1/2002 | Ishikawa et al. |
| 6,672,100 | B1* | 1/2004 | Taira ............... C10M 171/008 62/468 |
| 2003/0019614 | A1 | 1/2003 | Iwamoto et al. |
| 2006/0234082 | A1 | 10/2006 | Minami et al. |
| 2007/0089868 | A1 | 4/2007 | Houfuku et al. |
| 2007/0199684 | A1* | 8/2007 | Sasaki et al. .................. 165/133 |

FOREIGN PATENT DOCUMENTS

| | | | |
|---|---|---|---|
| JP | 07-012483 | A | 1/1995 |
| JP | 08-14786 | A | 1/1996 |
| JP | 10-206062 | A | 7/1998 |
| JP | 11-026430 | A | 1/1999 |
| JP | 2001-33185 | A | 2/2001 |
| JP | 3309778 | B2 | 7/2002 |
| JP | 3430909 | B2 | 7/2003 |
| JP | 2004-279025 | A | 10/2004 |

OTHER PUBLICATIONS

Extended European Search Report dated Dec. 6, 2013, issued by European Patent Office in corresponding European Patent Application No. 08853797.2 (6 pgs).
Office Action dated Jun. 20, 2013, issued by the Chinese Patent Office in the corresponding Chinese Patent Application No. 200880113654.8 and an English translation thereof. (8 pages).
Office Action (Reason for Refusal) issued on Jun. 9, 2014, by the Chinese Patent Office in corresponding Chinese Patent Application No. 200880113654.8 and an English translation of the Office Action. (17 pages).
Office Action (Notification of the Fourth Office Action) issued on Jan. 14, 2014, by the Chinese Patent Office in corresponding Chinese Patent Application No. 200880113654.8, and an English Translation of the Office Action. (11 Pages).
Office Action (Notification of Reason(s) for Refusal) dated Aug. 3, 2010, issued in Japanese Patent Application No. 2007-307483, and an English Translation thereof. (3 pages).
Office Action (First Office Action) dated May 10, 2012, issued in Chinese Patent Application No. 200880113654.8, and an English Translation thereof. (4 pages).
Office Action (Second Office Action) dated Dec. 14, 2012, issued in Chinese Patent Application No. 200880113654.8, and an English Translation thereof. (14 pages).
Office Action issued by the U.S. Patent and Trademark Office in the U.S. Appl. No. 12/680,602, mailed Nov. 26, 2012, U.S. Patent and Trademark Office, Alexandria, VA. (19 pages).

* cited by examiner

AIR CONDITIONER

TECHNICAL FIELD

The present invention relates to an air conditioner using a heat exchanger having heat transfer tubes with grooves inside the tubes.

BACKGROUND ART

A heat-pump type air conditioner using a fin tube type heat exchanger constituted by fins arranged at certain intervals, between which a gas (air) flows, and heat transfer tubes which have spiral grooves on their inner faces, perpendicularly pierce each of the fins and a refrigerant flows inside, is known.

The air conditioner is generally provided with an evaporator for evaporating the refrigerant and cooling air, water and the like by evaporation heat at that time; a compressor for compressing the refrigerant discharged from the evaporator, raising its temperature and supplying it to a condenser; the condenser for heating the air, and water and the like by heat of the refrigerant; an expansion valve for expanding the refrigerant discharged from the condenser, lowering its temperature and supplying it to the evaporator, and a four-way valve for switching between a heating operation and a cooling operation by switching a direction in which the refrigerant in a refrigerating cycle flows. In addition, the heat transfer tube is incorporated in the condenser and the evaporator so that the refrigerant containing refrigerating machine oil flows inside thereof (See Patent Document 1, for example).

[Patent Document 1] Japanese Patent Laid-Open No. H6-147532 (FIGS. 1 and 13)

DISCLOSURE OF THE INVENTION

Problems to be Solved by the Invention

In the above-mentioned air conditioner, the number of paths in an outdoor heat exchanger is set to be larger than the number of paths in an indoor heat exchanger so that a pressure loss inside the tubes of the outdoor heat exchanger in a heating operation is reduced. However, in such an air conditioner as above in which heat transfer tubes with a lead angle of spiral grooves larger than that of the heat transfer tubes of the indoor heat exchanger are used for the outdoor heat exchanger, there is a disadvantage that the pressure loss inside the tubes in the outdoor heat exchanger is increased according to increase of a heat transfer rate inside the tubes of the outdoor heat exchanger, and a coefficient of performance (COP) is lowered. And recently, improvement in heating performance largely contributing to an annual performance factor (APF) is in demand.

The present invention was made in view of the above problems and an object thereof is to provide an air conditioner that can increase heat exchange capacity of an indoor heat exchanger without increasing a pressure loss inside tubes of an outdoor-heat exchanger.

Means for Solving the Problems

An air conditioner according to the present invention comprises an indoor machine equipped with an indoor heat exchanger constituted by a plurality of heat transfer tubes which have spiral grooves formed with a predetermined lead angle on the faces inside the tubes and which pierce a plurality of fins, and an outdoor machine equipped with an outdoor heat exchanger constituted by a plurality of heat transfer tubes which have spiral grooves formed with a lead angle smaller than that of the heat transfer tubes used for said indoor heat exchanger and which pierce a plurality of fins.

Advantages

According to the air conditioner of the present invention, since the lead angle of the spiral grooves on the inner faces of the heat transfer tubes of the outdoor heat exchanger is set to be smaller than the lead angle of the spiral grooves on the inner faces of the heat transfer tubes of the indoor heat exchanger, a flow that would surmount the spiral grooves of the heat transfer tubes of the outdoor heat exchanger is hardly generated. Therefore a pressure loss inside the tubes is not increased, and the heat exchange rate can be improved. As a result, since the lead angle of the spiral grooves on the inner faces of the heat transfer tubes of the indoor heat exchanger is increased so that a liquid film generated between the spiral grooves of the heat transfer tubes of the indoor heat exchanger becomes thin, the heat exchange rate can be improved and an air conditioner with high efficiency can be obtained.

REFERENCE NUMERALS

Figure 1:
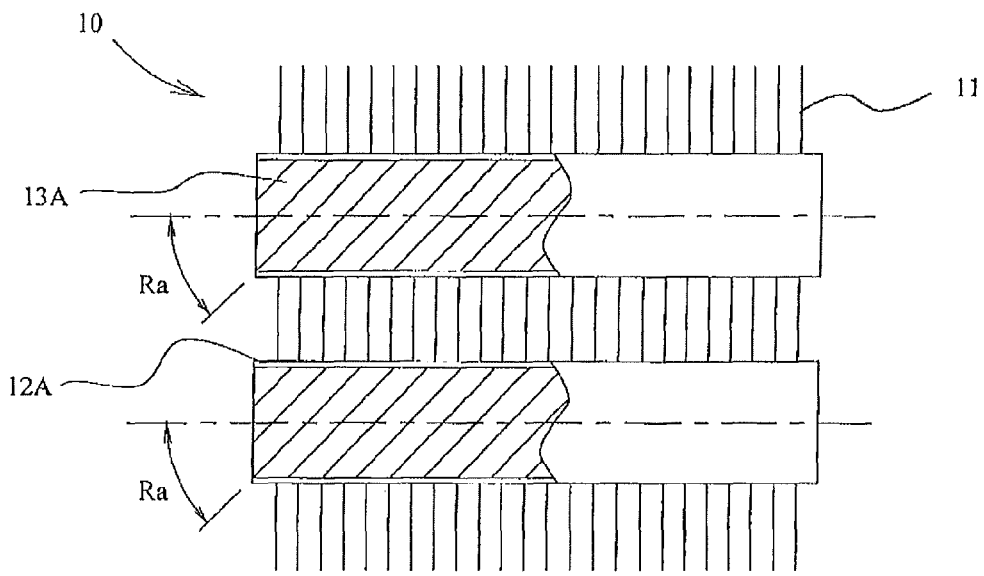
FIG. 1 is a partially enlarged view of a section in a vertical direction seen from a front side, of an indoor heat exchanger of an air conditioner according to an embodiment 1 of the present invention.

Ra, Tb: lead angle
10: indoor heat exchanger
11, 21: fin
12A to 12C, 22A to 22C: heat transfer tube
13A to 13C, 23A to 23C: spiral groove
20: outdoor heat exchanger
Ha, Hb: depth of spiral groove 30: tube expansion ball
31: rod
32: fluid

BEST MODE FOR CARRYING OUT THE INVENTION

Embodiment 1

The present invention will be described below referring to an illustrated embodiment.

Figure 2:
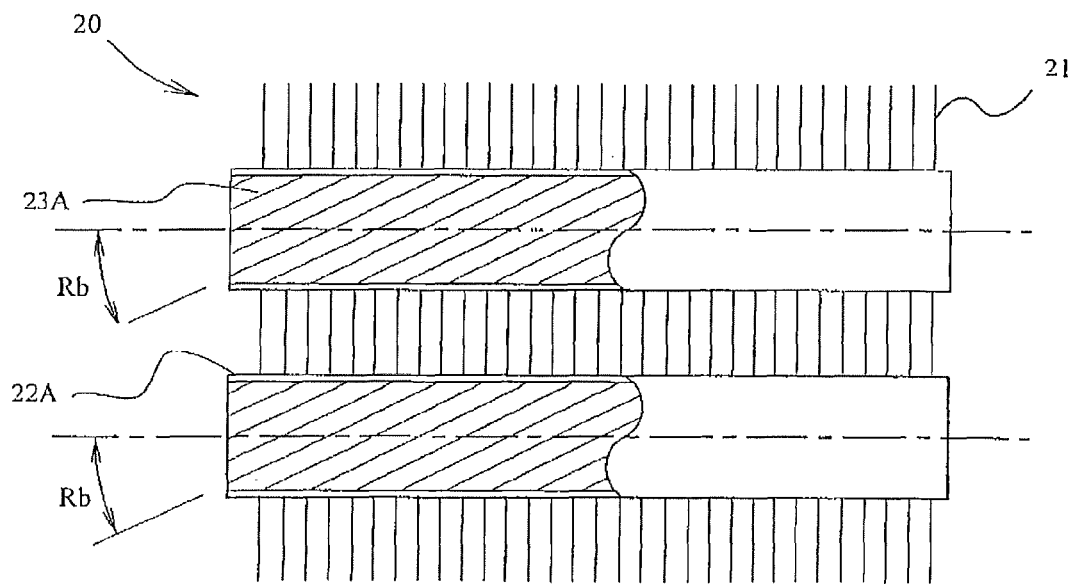
FIG. 2 is a partially enlarged view of the section in the vertical direction seen from the front side, of an outdoor heat exchanger of the air conditioner according to the embodiment 1 of the present invention.

FIG. 1 is a partially enlarged view of a section in a vertical direction seen from a front side, of an indoor heat exchanger of an air conditioner according to an embodiment 1 of the present invention, and FIG. 2 is a partially enlarged view of the section in the vertical direction seen from the front side, of an outdoor heat exchanger, both of which illustrate a section of adjacent heat transfer tubes and fins between them.

In the air conditioner of this embodiment, as shown in FIGS. 1 and 2, a fin 11 of an indoor heat exchanger 10 and a fin 21 of an outdoor heat exchanger 20 are both made of a metal material such as copper or copper alloy, aluminum or aluminum alloy or the like having favorable heat transfer properties, while heat transfer tubes 12A, 22A piercing each of the fins 11, 21 are also made of a metal material such as copper or copper alloy, aluminum or aluminum alloy or the like having favorable heat transfer properties, and spiral grooves 13A, 23A with lead angles Ra, Rb different from each other are formed on an inner face of each of the heat transfer tubes 12A, 22A.

In order to reduce a pressure loss of the heat exchanger, a better effect can be expected from an effect achieved by adjusting the lead angles Ra, Rb of the spiral grooves 13A, 23A of tube inner faces than an effect achieved by increasing the number of paths. Then, the air conditioner is constituted by an indoor machine equipped with the indoor heat exchanger 10 using the heat transfer tube 12A having the spiral grooves 13A with the lead angle Ra of 35 to 45 degrees on the tube inner face, and an outdoor machine equipped with the outdoor heat exchanger 20 using the heat transfer tube 22A with the spiral grooves 23A with the lead angle Rb smaller (25 to 35 degrees) than that of the heat transfer tube 12A is mounted.

In the air conditioner of this embodiment, the lead angle Rb of the spiral groove 23A of the heat transfer tube 22A of the outdoor heat exchanger 20 is set to be in a range of 25 to 35 degrees because if a lower limit of the lead angle Rb of the spiral grooves 23A is set at 25 degrees or below, a drop of the heat exchange rate becomes marked and if an upper limit of the lead angle Rb of the spiral grooves 23A is set at 35 degrees or above, the pressure loss inside the tubes is increased. As a result, a flow that would surmount the spiral grooves 23A is hardly generated, the heat exchange rate can be improved without an increase in the pressure loss inside the tubes, and an air conditioner with high efficiency can be obtained.

On the other hand, the lower limit of the lead angle of the spiral groove 13A of the heat transfer tube 12 A in the indoor heat exchanger 10 is set at 35 degrees in order to further improve the heat transfer performance inside the tubes, while the upper limit of the lead angle Ra of the spiral groove 13A is set at 45 degrees because if it is set to more than that, the increase in the pressure loss inside the tubes would become marked. As a result, the heat transfer performance inside the tubes of the indoor heat exchanger 10 can be further improved, and a heat exchanger with high efficiency can be obtained.

As mentioned above, in the air conditioner of this embodiment, since the lead angle Ra of the spiral grooves 13A on the inner face of the heat transfer tube 12A in the indoor heat exchanger 10 is increased so that the liquid film generated between the spiral grooves 13A is made thin, the heat exchange rate can be improved, and an air conditioner with high efficiency can be obtained.

And the heat exchanger of this embodiment is used as the evaporator or the condenser in a refrigerating cycle in which a compressor, a condenser, a throttling device, and an evaporator are connected in series by piping, and a refrigerant is used as a working fluid, so as to contribute to improvement in the coefficient of performance (COP). Also, as the refrigerant, any of an HC single refrigerant or a mixed refrigerant containing HC, R32, R410A, R407C, and carbon dioxide may be used, and the efficiency of heat exchange between these refrigerants and air is improved.

Embodiment 2

Figure 3:
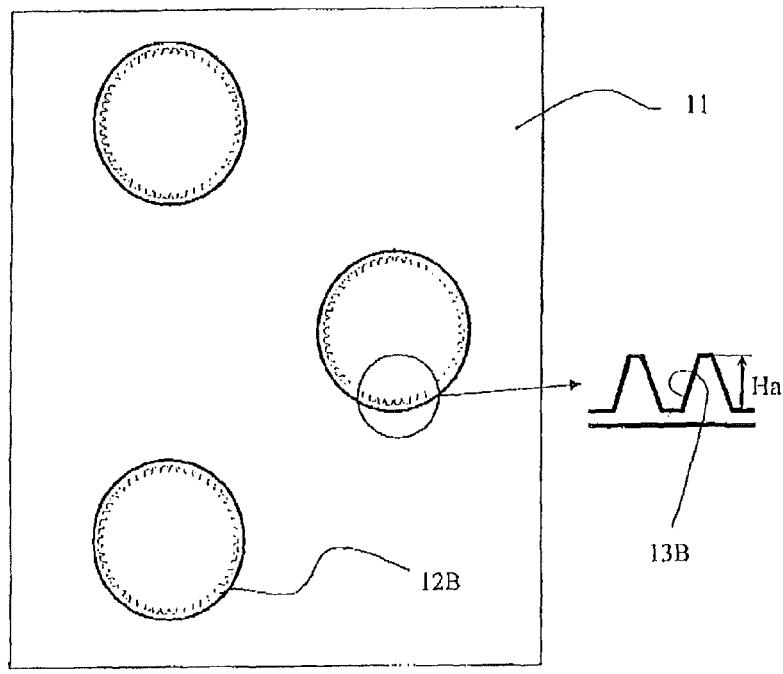
FIG. 3 is a partially enlarged view of a section in a vertical direction seen from a side face side, of an indoor heat exchanger of an air conditioner according to an embodiment 2 of the present invention.
Figure 4:
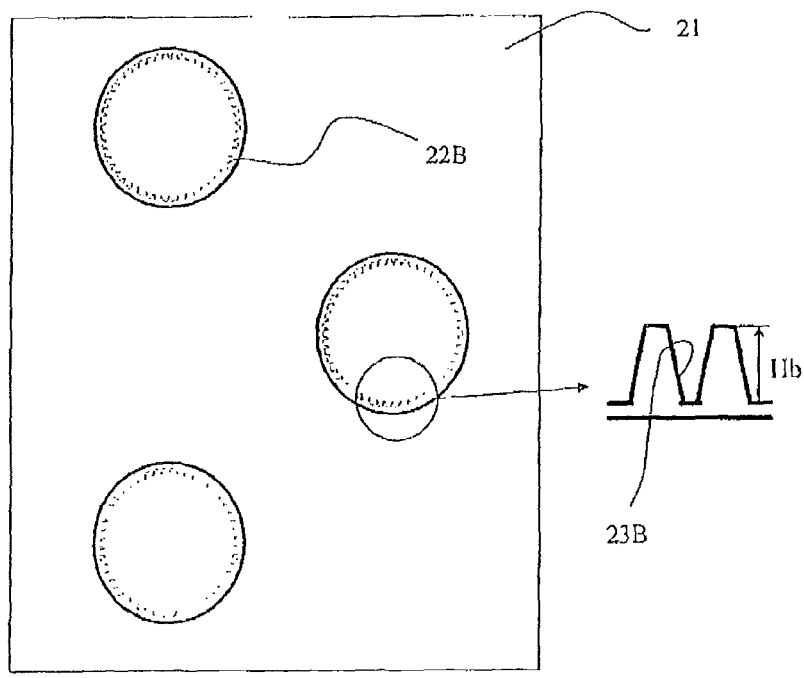
FIG. 4 is a partially enlarged view of the section in the vertical direction seen from the side face side, of an outdoor heat exchanger of the air conditioner according to the embodiment 2 of the present invention.

FIG. 3 is a partially enlarged view of a section in the vertical direction seen from the side face side, of an indoor heat exchanger in an air conditioner according to an embodiment 2 of the present invention, FIG. 4 is a partially enlarged view of the section in the vertical direction seen from the side face side, of the outdoor heat exchanger, and in each figure, the same reference numerals are given to the same portions as in the above-mentioned embodiment 1.

In the air conditioner of this embodiment, too, heat transfer tubes 12B, 22B are made of a metal material such as copper or copper alloy, aluminum or aluminum alloy or the like with favorable heat transfer property as in the above-mentioned embodiment 1 and used as heat transfer tubes for a condenser or a evaporator of a heat exchanger using a refrigerant containing refrigerating machine oil.

When this is explained in further detail, on the inner faces of the heat transfer tube 12B of the indoor heat exchanger and the heat transfer tube 22B of the outdoor heat exchanger, spiral grooves 13B, 23B are formed, respectively, and a depth Hb of the spiral grooves 23B of the heat transfer tube 22B in the outdoor heat exchanger (FIG. 4) is set to be larger than a depth Ha(Hb>Ha) of the spiral grooves 13B of the heat transfer tube 12B in the indoor heat exchanger (FIG. 3).

In the air conditioner of this embodiment, the depth Hb of the spiral grooves 23B of the outdoor heat exchanger is preferably 0.1 to 0.25 mm. Thereby, the pressure loss inside the tubes is not increased and the heat transfer performance can be further improved. However, if the groove depth is set at 0.25 mm or more, the pressure loss inside the tubes is increased.

On the other hand, the depth Ha of the spiral grooves 23B of the heat transfer tube 12B in the indoor heat exchanger is preferably 0.08 to 0.2 mm. Thereby, the pressure loss inside the tubes can be reduced.

As mentioned above, by setting the depth Hb of the spiral grooves 23B of the outdoor heat exchanger larger than the depth Ha of the spiral grooves 23B of the heat transfer tube 12B in the indoor heat exchanger, the heat transfer property inside the tubes of the outdoor heat exchanger can be further improved, and an air conditioner with high efficiency can be obtained.

Incidentally, the constitution of the spiral grooves 13B, 23B of this embodiment can be applied to the above-mentioned embodiment 1 as they are. In that case, since a synergetic effect of the effect realized by the lead angle adjustment of the spiral grooves in the above-mentioned embodiment 1 and the effect realized by the depth adjustment of the spiral grooves of this embodiment can be obtained, degree of design freedom is expanded.

Embodiment 3

Figure 5:
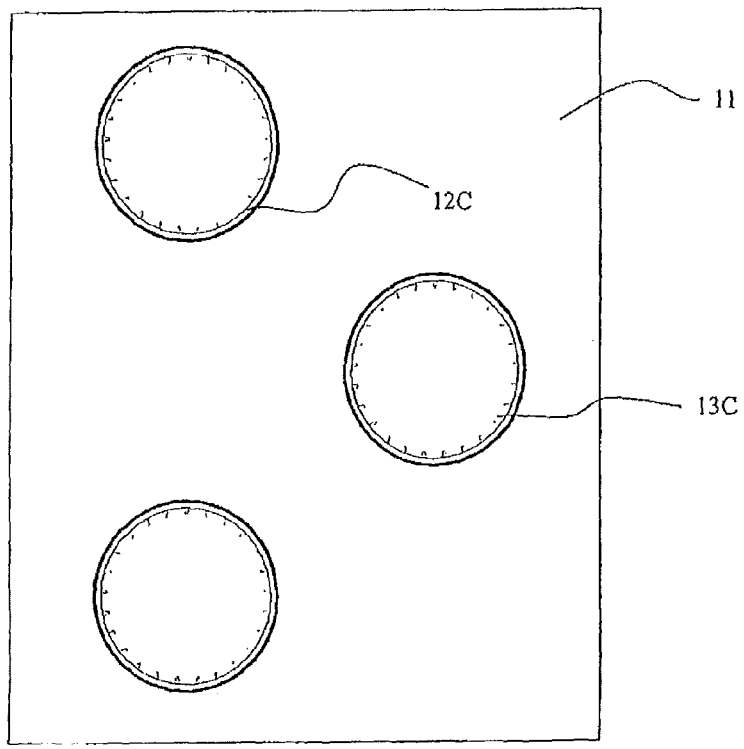
FIG. 5 is a partially enlarged view of a section in a vertical direction seen from a side face side, of an indoor heat exchanger of an air conditioner according to an embodiment 3 of the present invention.
Figure 6:
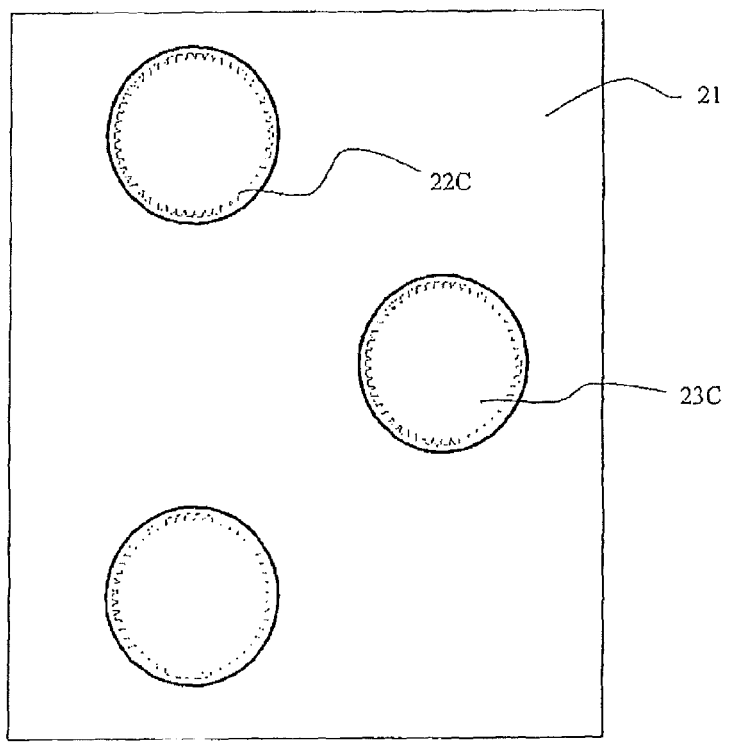
FIG. 6 is a partially enlarged view of the section in the vertical direction seen from the side face side, of an outdoor heat exchanger of the air conditioner according to the embodiment 3 of the present invention.

FIG. 5 is a partially enlarged view of a section in the vertical direction seen from the side face side, of an indoor heat exchanger of an air conditioner according to an embodiment 3 of the present invention, FIG. 6 is a partially enlarged view of a section in the vertical direction seen from the side face side, of its outdoor heat exchanger, and in each figure, the same reference numerals are given to the same portions as in the above-mentioned embodiment 1.

In the air conditioner of this embodiment, too, the heat transfer tubes 12C, 22C are made of a metal material such as copper or copper alloy, aluminum or aluminum alloy or the like with favorable heat transfer property similarly to the above-mentioned embodiment 1 and is used as a heat transfer tubes for a condenser or an evaporator of a heat exchanger using a refrigerant containing refrigerating machine oil.

When this is explained in further detail, on the inner faces of the heat transfer tube 12C of the indoor heat exchanger and the heat transfer tube 22C of the outdoor heat exchanger, spiral grooves 13C, 23C are formed, respectively, and it is set so that the number of threads of the spiral grooves 23C in the heat transfer tube 22C of the outdoor heat exchanger is larger than the number of threads of the spiral grooves 13C in the heat transfer tube 12C of the indoor heat exchanger. p In the air conditioner of this embodiment, the number of threads of the spiral grooves 23C in the heat transfer tube 22C of the outdoor heat exchanger is preferably 60 to 80. Thereby, the pressure loss inside the tubes is not increased and the heat transfer performance can be improved. However, if the number of threads is 80 or more, the pressure loss inside the tubes is increased.

On the other hand, the number of threads of the spiral grooves 13C in the heat transfer tube 12C of the indoor heat exchanger is preferably 40 to 60. Thereby, the pressure loss inside the tubes can be reduced.

As mentioned above, by setting the number of threads of the spiral grooves 23C in the heat transfer tube 22C of the outdoor heat exchanger larger than the number of threads of the spiral grooves 13C in the heat transfer tube 12C of the indoor heat exchanger, the heat transfer performance inside the tubes of the outdoor heat exchanger can be further improved, and an air conditioner with high efficiency can be obtained.

The constitution of the spiral grooves 13C, 23C of this embodiment can be applied to the above-mentioned embodiments 1 and 2 as they are. In that case, since a triple effect of the effect realized by the lead angle adjustment of the spiral grooves in the above-mentioned embodiment 1, the effect realized by the depth adjustment of the spiral grooves of the embodiment 2, and the effect realized by the thread number adjustment of the spiral grooves of this embodiment can be obtained, degree of design freedom is further expanded.

Embodiment 4

Figure 7:
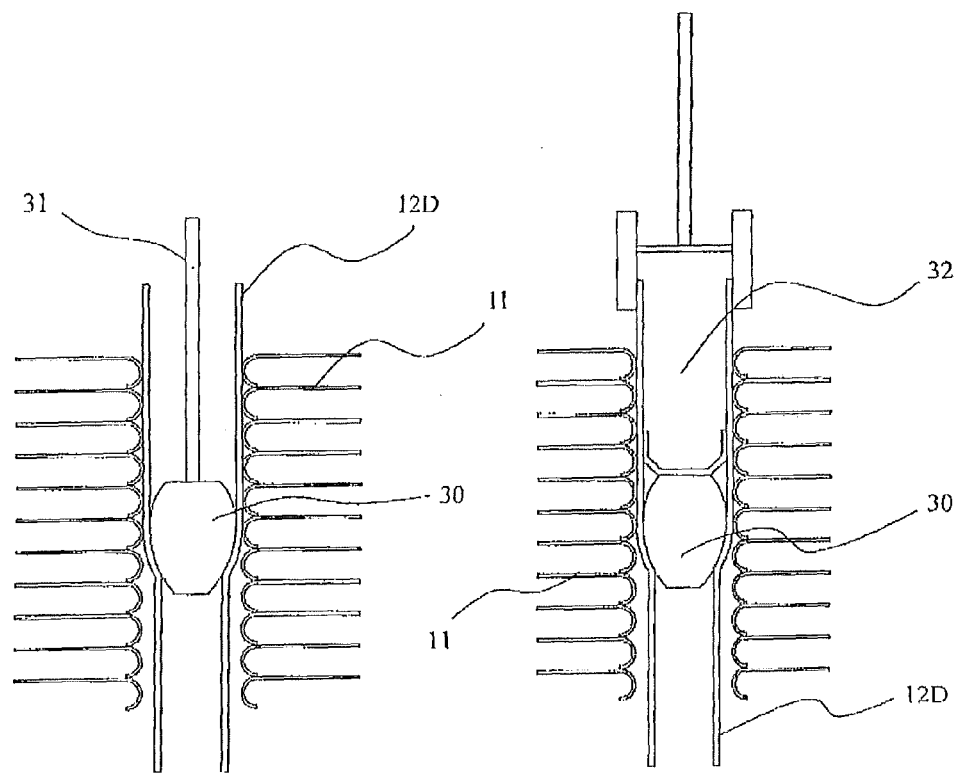
FIG. 7 is partially enlarged views of a section in the vertical direction seen from the front side, illustrating a manufacturing procedure of a heat exchanger of an air conditioner according to an embodiment 4 of the present invention.

FIG. 7 is partially enlarged views of a section in the vertical direction seen from the front face side, illustrating a manufacturing procedure of a heat exchanger of an air conditioner according to an embodiment 4 of the present invention. In each figure, the same reference numerals are given to the same portions as in the above-mentioned first embodiment. Since the indoor heat exchanger and the outdoor heat exchanger are both manufactured by the same procedure, the indoor heat exchanger is used as an example for explanation.

In the air conditioner of this embodiment, the heat exchanger is manufactured by the procedure as shown in FIG. 7. First, each heat transfer tube 12D is machined by bending so as to have a hairpin shape at the respective center part in the longitudinal direction with a predetermined bending pitch, so as to manufacture a plurality of hairpin tubes. Subsequently, these hairpin tubes are made to pierce a plurality of fins 11 arranged in parallel with each other with predetermined intervals and then, using a mechanical tube expansion method in which a tube expansion ball 30 is pushed into each hairpin tube by a rod 31 or a hydraulic pressure tube expansion method in which the tube expansion ball 30 is pushed into the hairpin tube by a hydraulic pressure of a fluid 32, the hairpin tube is expanded and each fin 11 and the hairpin tube, that is, the heat transfer tube 12D, are joined together.

As mentioned above, in the air conditioner of this embodiment, only by expanding the hairpin tube as a constituent member of the heat exchanger using the mechanical tube expansion method or hydraulic pressure tube expansion method, a large number of fins 11 and the hairpin tubes (heat transfer tubes 12D) are joined together, which facilitates manufacture of the heat exchanger.

Embodiment 5

In the above-mentioned embodiment 4, the fin 11 and the hairpin tube (heat transfer tube 12D) are joined only by tube expansion of the hairpin tube, but if a tube expansion rate is not specified, there will be fluctuation in products. Therefore, in this embodiment 5, the tube expansion rate of the heat transfer tube in the indoor heat exchanger is specified.

That is, in this embodiment, the tube expansion rate at the time when the hairpin tube is expanded by the mechanical tube expansion method or hydraulic pressure tube expansion method is set at 105.5 to 106.5% for the heat transfer tube of the indoor heat exchanger. Thereby, a property of close contact between the heat transfer tube and the fins of the indoor heat exchanger is improved, and an air conditioner with high efficiency can be obtained. However, if the tube expansion rate of the heat transfer tube in the indoor heat exchanger exceeds 106.5%, since the number of threads of the spiral grooves of the heat transfer tube in the indoor heat exchanger is smaller than the number of threads of the spiral grooves of the heat transfer tube in the outdoor heat exchanger as mentioned above, a crush might be caused at Lop portions of the spiral grooves, so that the property of close contact between the heat transfer tube and the fins is deteriorated.

Embodiment 6

In the above-mentioned embodiment 4, the fins 11 and the hairpin tube (heat transfer tube 12D) are joined only by tube expansion of the hairpin tube, but if a tube expansion rate is not specified, there will be fluctuation in products. Therefore, in this embodiment 6, the tube expansion rate of the heat transfer tube in the outdoor heat exchanger is specified.

That is, in this embodiment, the tube expansion rate at the time when the hairpin tube is expanded by the mechanical tube expansion method or hydraulic pressure tube expansion method is set at 106 to 107.5% for the heat transfer tube of the outdoor heat exchanger. Thereby, the property of close contact between the heat transfer tube and the fins of the outdoor heat exchanger is improved, and an air conditioner with high efficiency can be obtained. At this time, since the number of threads of the spiral grooves of the heat transfer tube in the outdoor heat exchanger is larger than the number of threads of the spiral grooves of the heat transfer tube in the indoor heat exchanger as mentioned above and thus, a crush does not occur at the top portions of the spiral grooves. Also, with an increase in the tube expansion rate in the heat transfer tube of the outdoor heat exchanger, an inner diameter of the heat transfer tube is increased, and the pressure loss inside the tubes is reduced.

In the above-mentioned embodiments 4 to 6, the fins 11 and the hairpin tube (heat transfer tube 12D) are joined only by tube expansion of the heat transfer tube, but the heat transfer tube 12D and the fins 11 may be completely joined further by brazing after the joining of the fins 11 and the hairpin tube (heat transfer tube 12D) by tube expansion, by which reliability can be further improved.

EXAMPLES

Examples of the present invention will be described below in comparison with comparative examples outside of the scope of the present invention. First, heat exchangers in the examples 1 and 2 respectively having a lead angle of the spiral grooves of the heat transfer tube in the indoor heat exchanger (hereinafter referred to as an "indoor lead angle") of 45 degrees and a lead angle of the spiral grooves of the heat transfer tube in the outdoor heat exchanger (hereinafter referred to as an "outdoor lead angle") of 35 degrees, and the indoor lead angle of 35 degrees and the outdoor lead angle of 25 degrees are manufactured. Also, as comparative examples, the heat exchangers in comparative examples 1 to 3 respectively having the indoor lead angle of 45 degrees and the outdoor lead angle of 45 degrees, the indoor lead angle of 35 degrees and the outdoor lead angles of 35 degrees, and the indoor lead angle of 25 degrees and the outdoor lead angle of 25 degrees are manufactured. The coefficients of performance (COP=heat exchanger capacity/compressor input) of heating performance and cooling performance in a refrigerating cycle using the heat exchangers in the examples 1 and 2 and the comparative examples 1 to 3 are shown in Table 1 below:

TABLE 1

|  | Indoor lead angle | Outdoor lead angle | Heating COP (%) | Cooling COP (%) |
| --- | --- | --- | --- | --- |
| Comparative Example 1 | 45 degrees | 45 degrees | 100.0 | 100.0 |
| Example 1 | 45 degrees | 35 degrees | 100.6 | 100.4 |
| Comparative Example 2 | 35 degrees | 35 degrees | 99.5 | 99.8 |
| Example 2 | 35 degrees | 25 degrees | 101.0 | 100.5 |
| Comparative Example 3 | 25 degrees | 25 degrees | 99.0 | 99.5 |

As obvious from Table 1, the heat exchangers in the example 1 and the example 2 both have higher coefficients of performance (COP) than those of the comparative examples 1 to 3, and the heat transfer performance inside the tubes is improved.

Subsequently, heat exchangers of an example 3 and an example 4 respectively having a depth of the spiral grooves in the heat transfer tube of the indoor heat exchanger (hereinafter referred to as an "indoor groove depth") of 0.08 mm and a depth of the spiral grooves in the heat transfer tube of the outdoor heat exchanger (hereinafter referred to as an "outdoor groove depth") of 0.1 mm, and the indoor groove depth of 0.2 mm and the outdoor groove depth of 0.25 mm are manufactured. Also, as comparative examples, the heat exchangers in comparative examples 4 to 6 respectively having the indoor groove depth of 0.08 mm and the outdoor groove depth of 0.08 mm, the indoor groove depth of 0.2 mm and the outdoor groove depth of 0.2 mm, and the indoor groove depth of 0.25 mm and the outdoor groove depth of 0.25 mm are manufactured. The coefficients of performance (COP=heat exchanger capacity/compressor input) of heating performance and cooling performance in a refrigerating cycle using the heat exchangers in the examples 3 and 4 and the comparative examples 4 to 6 are shown in Table 2 below:

TABLE 2

|  | Indoor groove depth | Outdoor groove depth | Heating COP (%) | Cooling COP (%) |
| --- | --- | --- | --- | --- |
| Comparative Example 4 | 0.08 mm | 0.08 mm | 99.4 | 99.6 |
| Example 3 | 0.08 mm | 0.1 mm | 100.4 | 100.2 |
| Comparative Example 5 | 0.2 mm | 0.2 mm | 99.7 | 99.9 |
| Example 4 | 0.2 mm | 0.25 mm | 100.5 | 100.3 |
| Comparative Example 6 | 0.25 mm | 0.25 mm | 100.0 | 100.0 |

As obvious from Table 2, the heat exchangers in the example 3 and the example 4 both have higher coefficients of performance (COP) than those of the comparative examples 4 to 6, and the heat transfer performance inside the tubes is improved.

Subsequently, the heat exchangers in an example 5 and an example 6 respectively having the number of threads of the spiral grooves in the heat transfer tube in the indoor heat exchanger (hereinafter referred to as the "number of indoor groove threads") of 40 and the number of threads of the spiral grooves in the heat transfer tube in the outdoor heat exchanger (hereinafter referred to as the "number of outdoor groove threads") of 60, and the number of indoor groove threads of 60 and the number of outdoor groove threads of 80 are manufactured. Also, as comparative examples, the heat exchangers in comparative examples 7 to 9 respectively having the number of indoor groove threads of 40 and the number of outdoor groove threads of 40, the number of indoor groove threads of 60 and the number of outdoor groove threads of 60, and the number of indoor groove threads of 80 and the number of outdoor groove threads of 80 are manufactured. The coefficients of performance (COP=heat exchanger capacity/compressor input) of heating performance and cooling performance in a refrigerating cycle using the heat exchangers in the examples 5 and 6 and the comparative examples 7 to 9 are shown in Table 3 below:

TABLE 3

|  | Number of indoor groove threads | Number of outdoor groove threads | Heating COP (%) | Cooling COP (%) |
| --- | --- | --- | --- | --- |
| Comparative Example 7 | 40 | 40 | 100.0 | 100.0 |
| Example 5 | 40 | 60 | 100.6 | 100.3 |
| Comparative Example 8 | 60 | 60 | 99.9 | 99.4 |
| Example 6 | 60 | 80 | 100.8 | 100.5 |
| Comparative Example 9 | 80 | 80 | 99.4 | 99.0 |

As obvious from Table 3, the heat exchangers in the example 5 and the example 6 both have higher coefficients of performance (COP) than those of the comparative examples 7 to 9, and the heat transfer performance inside the tubes is improved.

The invention claimed is:

1. An air conditioner comprising:
   an indoor machine equipped with an indoor heat exchanger constituted by a plurality of heat transfer tubes which pierce a plurality of fins, the plurality of heat transfer tubes having spiral grooves whose lead angle is 35 to 45 degrees formed on faces inside the tubes, and
   an outdoor machine equipped with an outdoor heat exchanger constituted by a plurality of heat transfer tubes which pierce a plurality of fins, the plurality of heat transfer tubes having spiral grooves, formed on faces inside the tubes, whose lead angle is smaller than the lead angle of the plurality of heat transfer tubes in the indoor heat exchanger,
   wherein the indoor heat exchanger functions as both an evaporator and a condenser, and the outdoor heat exchanger functions as both of an evaporator and a condenser, and
   wherein the lead angle of the spiral grooves formed in the plurality of heat transfer tubes in the outdoor heat exchanger is 25 to 35 degrees.

2. The air conditioner of claim 1, wherein a depth of the spiral grooves of the plurality of heat transfer tubes in the outdoor heat exchanger is set to be deeper than a depth of the spiral grooves of the plurality of heat transfer tubes in the indoor heat exchanger.

3. The air conditioner of claim 2, wherein a number of threads of the spiral grooves of the plurality of heat transfer tubes in the outdoor heat exchanger is set to be larger than a number of threads of the spiral grooves of the plurality of heat transfer tubes in the indoor heat exchanger.

4. The air conditioner of claim 2, wherein in the indoor heat exchanger or outdoor heat exchanger, the plurality of heat transfer tubes and the plurality of fins are joined together by expanding the plurality of heat transfer tubes by a mechanical tube expansion method or hydraulic pressure tube expansion method.

5. The air conditioner of claim 1, wherein a number of threads of the spiral grooves of the plurality of heat transfer tubes in the outdoor heat exchanger is set to be larger than a number of threads of the spiral grooves of the plurality of heat transfer tubes in the indoor heat exchanger.

6. The air conditioner of claim 5, wherein in the indoor heat exchanger or outdoor heat exchanger, the plurality of heat transfer tubes and the plurality of fins are joined together by expanding the plurality of heat transfer tubes by a mechanical tube expansion method or hydraulic pressure tube expansion method.

7. The air conditioner of claim 1, wherein in the indoor heat exchanger or outdoor heat exchanger, the plurality of heat transfer tubes and the plurality of fins are joined together by expanding the plurality of heat transfer tubes by a mechanical tube expansion method or hydraulic pressure tube expansion method.

8. The air conditioner of claim 7, wherein an expanded diameter of the plurality of heat transfer tubes of the indoor heat exchanger by the mechanical tube expansion method or the hydraulic pressure tube expansion method is 105.5 to 106.5% of an original diameter of the plurality of heat transfer tubes of the indoor heat exchanger.

9. The air conditioner of claim 7, wherein an expanded diameter of the plurality of heat transfer tubes of the outdoor heat exchanger by the mechanical tube expansion method or the hydraulic pressure tube expansion method is 106 to 107.5% of an original diameter of the plurality of heat transfer tubes of the outdoor heat exchanger.

10. The air conditioner of claim 7, wherein the plurality of heat transfer tubes and the plurality of fins joined by the mechanical tube expansion method are further joined together by brazing.

11. The air conditioner of claim 1, wherein the plurality of heat transfer tubes are formed of a metal material comprising at least one of copper, copper alloy, aluminum or aluminum alloy.

12. The air conditioner of claim 1, wherein R32 is used as a refrigerant.

13. The air conditioner of claim 1, wherein R410A is used as a refrigerant.

14. The air conditioner of claim 1, wherein R407C or carbon dioxide is used as a refrigerant.

* * * * *